Feb. 5, 1957  W. R. CURRY  2,780,073
AUTOMOBILE COOLER
Filed Aug. 30, 1955
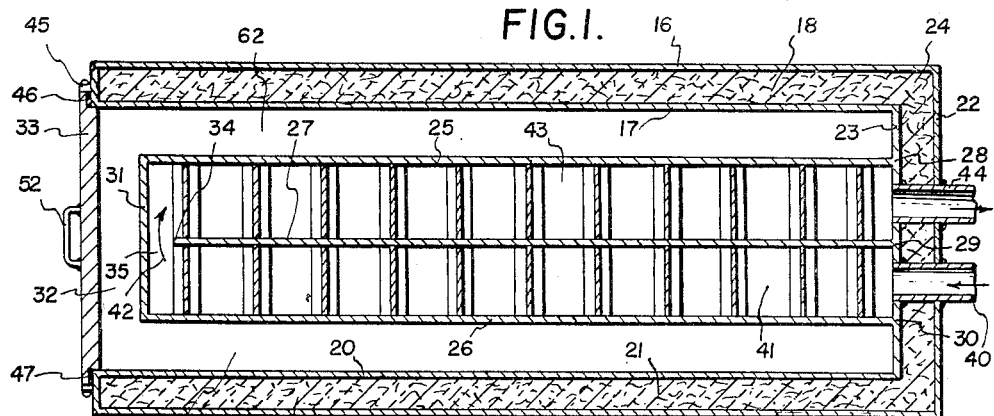
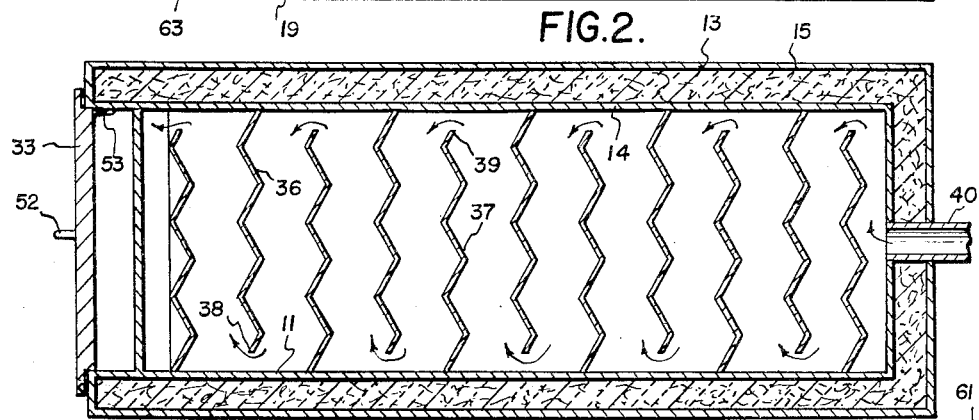
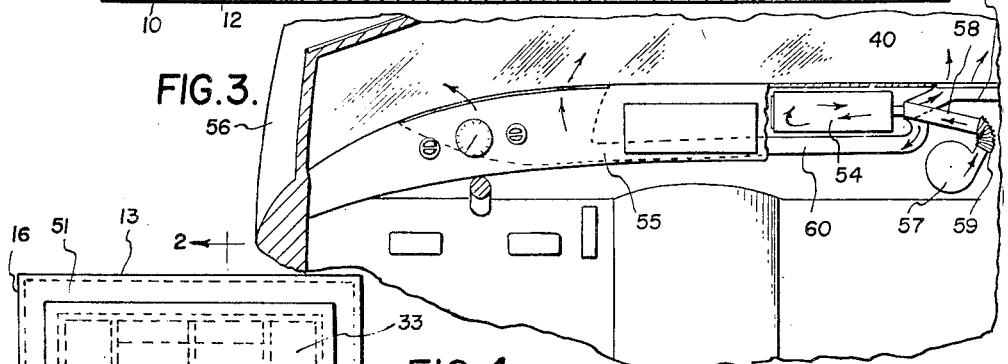
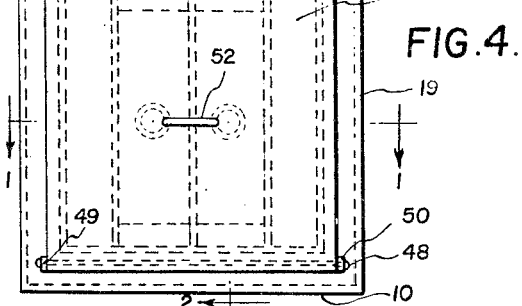
INVENTOR.
William R. Curry,
BY *Victor J. Evans & Co.*
ATTORNEYS

United States Patent Office 2,780,073
Patented Feb. 5, 1957

2,780,073

AUTOMOBILE COOLER

William R. Curry, Babbitt, Nev.

Application August 30, 1955, Serial No. 531,554

5 Claims. (Cl. 62—91.5)

This invention relates to coolers for motor vehicles and particularly vehicles of the pleasure and passenger type, and in particular, a housing having insulated walls with an interrupted air circulating compartment in the center and refrigerant chambers on each side and with means for connecting the housing to the blower of the conventional heater of the vehicle and to the defrosting system whereby air is drawn from the defroster intake and cool fresh air is discharged through the defroster tubes into the vehicle.

The purpose of this invention is to provide an air conditioning system for motor vehicles that is adapted to be operated by the motor of the heater of the vehicle.

Various types of air conditioning systems have been provided for motor vehicles, however, conventional air conditioning systems are relatively complicated and consequently are difficult to install in motor vehicles. Where some systems are used in motor vehicles, substantially all available area below the hood is utilized and it is necessary to remove the parts to change a spark plug or make other repairs to the engine. With this thought in mind, this invention contemplates an air conditioning unit or cooler that is adapted to be operated by a motor in the vehicle, such as the motor of a heater, in which the motor is not used at the same time as the air conditioning unit would be used, and in which the device is comparatively small so that it is adapted to be positioned below the instrument panel of a vehicle.

The object of this invention is, therefore, to provide a cooler in which air is circulated through a housing having a refrigerant therein whereby with continuous operation of the device substantially all air in the body of the vehicle is cooled.

Another object of the invention is to provide a cooler for motor vehicles in which the complete cooling unit is adapted to be installed behind the instrument panel of a vehicle.

A further object of the invention is to provide an air cooling unit for motor vehicles that is adapted to be combined with the motor of a heater of the vehicle and the defrosting system to facilitate circulating cool air throughout the body of the vehicle in which the device is of a simple and economical construction.

With these and other objects and advantages in view, the invention embodies a housing having insulated walls with a closure at one end and with an interrupted U-shaped passage in the intermediate part whereby with Dry Ice on both sides of the passage air will be cooled as it is circulated therethrough.

Other features and advantages of the invention will appear from the following description, taken in connection with the drawing, wherein:

Figure 1 is a sectional plan through the cooler taken on line 1—1 of Figure 4 showing the air passage through the center with the intake and outlet connections extended therefrom.

Figure 2 is a vertical section through one of the sections of the cooler taken on line 2—2 of Figure 4.

Figure 3 is a cross section through a portion of a motor vehicle body showing the arrangement of the cooler therein with parts broken away and with the parts shown on a reduced scale.

Figure 4 is an end elevational view of the heater looking toward the end on which the closure is positioned.

Referring now to the drawing wherein like reference characters denote corresponding parts, the improved motor vehicle air conditioner or cooler of this invention includes a box like housing having a base with an outer wall 10, an inner wall 11 and insulation 12 positioned between the walls, a cover having an outer wall 13, an inner wall 14 and insulation 15 positioned between the walls, an outer side wall 16 on one side of the housing, an inner side wall 17 and insulation 18 positioned between the walls 16 and 17, an outer wall 19 on the opposite side of the housing with an inner wall 20 and insulation 21 positioned between the walls 19 and 20 and an end having an outer wall 22, an inner wall 23 and insulation 24 positioned between the walls.

With the body of the housing formed as illustrated and described, intermediate partitions 25 and 26 with a center partition 27 spaced from and parallel to the intermediate partitions are mounted in the housing with ends of the partitions secured to the inner panel or wall 23 of the end wall, such as by welding, as shown at points 28, 29 and 30. The inner ends of the partitions 25 and 26 are connected with an end wall 31 providing a passage 32 between a cover 33 and the center compartment. The ends of the center partition 27 also terminate at a point 34 whereby a passage 35 is provided between the end of the partition 34 and the cross wall 31.

The air is circulated over corrugated vanes, such as vanes 36 depending from the panel 14 of the cover, and upwardly disposed vanes 37 extended from the panel 11 of the base. The vanes 36 terminate at points 38 spaced from the panel 11 and upper ends of the vanes 37 terminate at points 39 spaced downwardly from the panel 14 whereby air circulating passages are provided over ends of one set of vanes and below ends of alternate vanes. By this means air is cirulated through an intake connection 40 which communicates with a compartment or channel 41, around the end of the partition 27 as indicated by an arrow 42 and through a passage or channel 43 to an outlet connection 44.

The cover 33 is provided with a continuous flange 45 with a sealing gasket 46 in a continuous recess 47 and, as shown in Figures 2 and 4, the closure is pivotally mounted with a pin 48 that extends through the lower edge and the pin is pivotally mounted in ears 49 and 50 extended from a face 51 connecting edges of panels of the base cover and back wall.

The closure 33 is also provided with a handle 52 with which the closure may be opened and closed. The inner surface of the closure 33 is also provided with a spring clip 53 that retains the closure in the closed position, as shown in Figure 2.

The parts are secured together by welding or other suitable means.

With a cooler, as indicated by the numeral 54, incorporated behind an instrument panel 55 of a motor vehicle 56, the intake connection 40 is connected to the discharge of a blower 57 with a tube 58 and a flexible elbow 59 and the discharge connection 44 is connected to tubes 60 and 61 of the defrosting system whereby cool air discharged from the cooler is distributed throughout the interior of the vehicle.

By this means an air conditioning system or cooler is provided in a motor vehicle and the motor and blower of the heater of the vehicle, which is only used when the temperature is comparatively low, is utilized as the operating or circulating means and the use of an additional blower or motor is not required.

The closure 33 provides means for refilling compartments 62 and 63 in the sides of the housing with a refrigerant, such as Dry Ice.

It will be understood that modifications, within the scope of the appended claims, may be made in the design and arrangement of the parts without departing from the spirit of the invention.

What is claimed is:

1. A motor vehicle cooler comprising a housing having insulated side walls, an insulated base, an insulated cover, and an insulated end wall, the opposite end being open, a closure for the open end of the housing, a center compartment in said housing spaced from the side walls, a longitudinally disposed partition in the center compartment extended from the insulated end wall of the housing to a point spaced from the opposite end of the center compartment providing air circulating chambers in the center compartment on opposite sides of the longitudinally disposed partition, inlet and outlet connections extended from the center compartment through the insulated end wall of the housing, spaced transversely disposed baffles in the center compartment and extended upwardly from the base of the housing to points spaced downwardly from the cover, similar baffles also mounted in the center compartment positioned between the baffles extended upwardly from the base and extended from the cover to points spaced upwardly from the base, and means for cooling said baffles.

2. A motor vehicle cooler comprising a housing having insulated side walls, an insulated base, an insulated cover, and an insulated end wall, the opposite end being open, a closure for the open end of the housing, a center compartment in said housing, inlet and outlet connections extended from the center compartment through the insulated end wall of the housing, a center partition in the center compartment extended from the insulated end wall of the housing to a point spaced inwardly from the opposite end of the center compartment, said center partition being positioned between the inlet and outlet connections, spaced transversely disposed baffles extending from the inner panel of the cover to points spaced from the upper surface of the base, similar baffles extended upwardly from the upper panel of the base and positioned between the baffles extended from the inner panels of the cover to points spaced above the base providing a zigzag air passage through the center compartment from the inlet connection to the outlet connection, and means for cooling said baffles.

3. In a motor vehicle cooler, the combination which comprises a housing rectangular shaped in elevation and rectangular shaped in cross section having side walls, a base, a cover, and an end wall, the opposite end being open, said side walls, base, cover and end wall including spaced plates with insulation between the plates, a closure positioned in the open end of the housing and hinged to the base thereof, a spring latch for retaining the closure in the closed position, a longitudinally disposed center partition extended from the end wall to a point spaced from the opposite end of the housing, intermediate partitions spaced from the center partition and also spaced from inner plates of the side walls providing refrigerant compartments at the sides of the partition, said intermediate partitions being connected by an end panel spaced beyond the end of the center partition and spaced from the closure of the housing, spaced corrugated baffles depending from the inner plate of the cover of the housing and terminating at points spaced from the inner plate of the base of the housing, alternating baffles extended upwardly from the inner plate of the base of the housing and positioned with upper ends thereof spaced downwardly from the inner plate of the cover of the housing, said baffles extended from the base being positioned between the baffles depending from the cover, an inlet connection positioned on one side of the center partition and extended through the end wall of the housing, and an outlet connection positioned on the opposite side of the center partition and also extended through the end wall of the housing.

4. In a motor vehicle cooler, the combination which comprises a housing rectangular shaped in elevation and rectangular shaped in cross section having side walls, a base, a cover, and an end wall, the opposite end being open, said side walls, base, cover and end wall including spaced plates with insulation between the plates, a closure positioned in the open end of the housing and hinged to the base thereof, a spring latch for retaining the closure in the closed position, a longitudinally disposed center partition extended from the end wall to a point spaced from the opposite end of the housing, intermediate partitions spaced from the center partition and also spaced from inner plates of the side walls providing refrigerant compartments at the sides of the partition, said intermediate partitions being connected by an end panel spaced beyond the end of the center partition and spaced from the closure of the housing, spaced corrugated baffles depending from the inner plate of the cover of the housing and terminating at points spaced from the inner plate of the base of the housing, alternating baffles extended upwardly from the inner plate of the base of the housing and positioned with upper ends thereof spaced downwardly from the inner plate of the cover of the housing, said baffles extended from the base being positioned between the baffles depending from the cover, an inlet connection positioned on one side of the center partition and extended through the end wall of the housing, and an outlet connection positioned on the opposite side of the center partition and also extended through the end wall of the housing, said housing being adapted to be positioned behind the instrument panel of a motor vehicle with the inlet connection connected to the discharge of the pump of the heater of the vehicle and with the outlet connection connected to the defrosting tubes of the vehicle.

5. In a motor vehicle cooler, the combination which comprises a housing rectangular shaped in elevation and rectangular shaped in cross section having side walls, a base, a cover, and an end wall, the opposite end being open, said side walls, base, cover and end wall including spaced plates with insulation between the plates, a closure positioned in the open end of the housing and hinged to the base thereof, a spring latch for retaining the closure in the closed position, a longitudinally disposed center partition extended from the end wall to a point spaced from the opposite end of the housing, intermediate partitions spaced from the center partition and also spaced from inner plates of the side walls providing refrigerant compartments at the sides of the partition, said intermediate partitions being connected by an end panel spaced beyond the end of the center partition and spaced from the closure of the housing, spaced corrugated baffles depending from the inner plate of the cover of the housing and terminating at points spaced from the inner plate of the base of the housing, alternating baffles extended upwardly from the inner plate of the base of the housing and positioned with upper ends thereof spaced downwardly from the inner plate of the cover of the housing, said baffles extended from the base being positioned between the baffles depending from the cover, an inlet connection positioned on one side of the center partition and extended through the end wall of the housing, an outlet connection positioned on the opposite side of the center partition and also extended through the end wall of the housing, a blower connected to the intake connection of the housing, and distributing tubes connected to the outlet connection of the housing.

References Cited in the file of this patent

UNITED STATES PATENTS

| 456,444 | Smith | July 21, 1891 |
| 1,325,850 | Humphreys | Dec. 23, 1919 |
| 2,512,198 | Davidson | June 20, 1950 |